United States Patent
Arnaud et al.

(10) Patent No.: US 6,242,892 B1
(45) Date of Patent: Jun. 5, 2001

(54) PORTABLE ELECTRONIC DEVICE AND METHOD

(75) Inventors: Thierry Arnaud, Soleil; Nadmi Khlat, Pierre de Fermat, both of (FR)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/297,485
(22) PCT Filed: Sep. 3, 1998
(86) PCT No.: PCT/EP98/05719
 § 371 Date: Apr. 30, 1999
 § 102(e) Date: Apr. 30, 1999
(87) PCT Pub. No.: WO99/12245
 PCT Pub. Date: Mar. 11, 1999

(30) Foreign Application Priority Data

Sep. 3, 1997 (FR) ................................................ 97 10942

(51) Int. Cl.[7] ..................................................... H02J 7/14
(52) U.S. Cl. ............................. 320/135; 320/136; 307/48
(58) Field of Search ..................................... 320/135, 136, 320/103; 307/48, 66

(56) References Cited

U.S. PATENT DOCUMENTS

| | | | |
|---|---|---|---|
| 4,673,826 | * 6/1987 | Masson | 307/66 |
| 5,200,688 | * 4/1993 | Patino | 320/104 |
| 5,739,596 | * 4/1998 | Takizawa et al. | 307/66 |
| 5,777,454 | * 7/1998 | McAndrews et al. | 320/103 |
| 5,804,894 | * 9/1998 | Lesson et al. | 307/130 |
| 5,814,972 | * 9/1998 | Shimida et al. | 320/132 |
| 5,986,435 | * 11/1999 | Koenck | 320/136 |

* cited by examiner

Primary Examiner—Edward H. Tso
Assistant Examiner—Gregory J. Toatley, Jr.
(74) Attorney, Agent, or Firm—Lanny L. Parker

(57) ABSTRACT

A portable electronic device such as a mobile telephone is powered by a battery and is arranged to operate in an off-mode, a standby mode and an on-mode of operation. Primary electronic circuitry, operable only during the on-mode, provides the main features of the device. Secondary electronic circuitry is operable during the off-mode, and standby circuitry is operable during the standby mode. A power supply circuit is arranged for coupling to the battery in order to provide power to the electronic device during the on-mode. A secondary power source is arranged to be charged by the power supply circuit during the on-mode and further arranged for providing power to the second electronic circuitry during the off-mode. The secondary power source is further arranged for providing power to the standby circuitry during the standby mode, such that the power supply circuit does not operate during the standby mode.

10 Claims, 1 Drawing Sheet

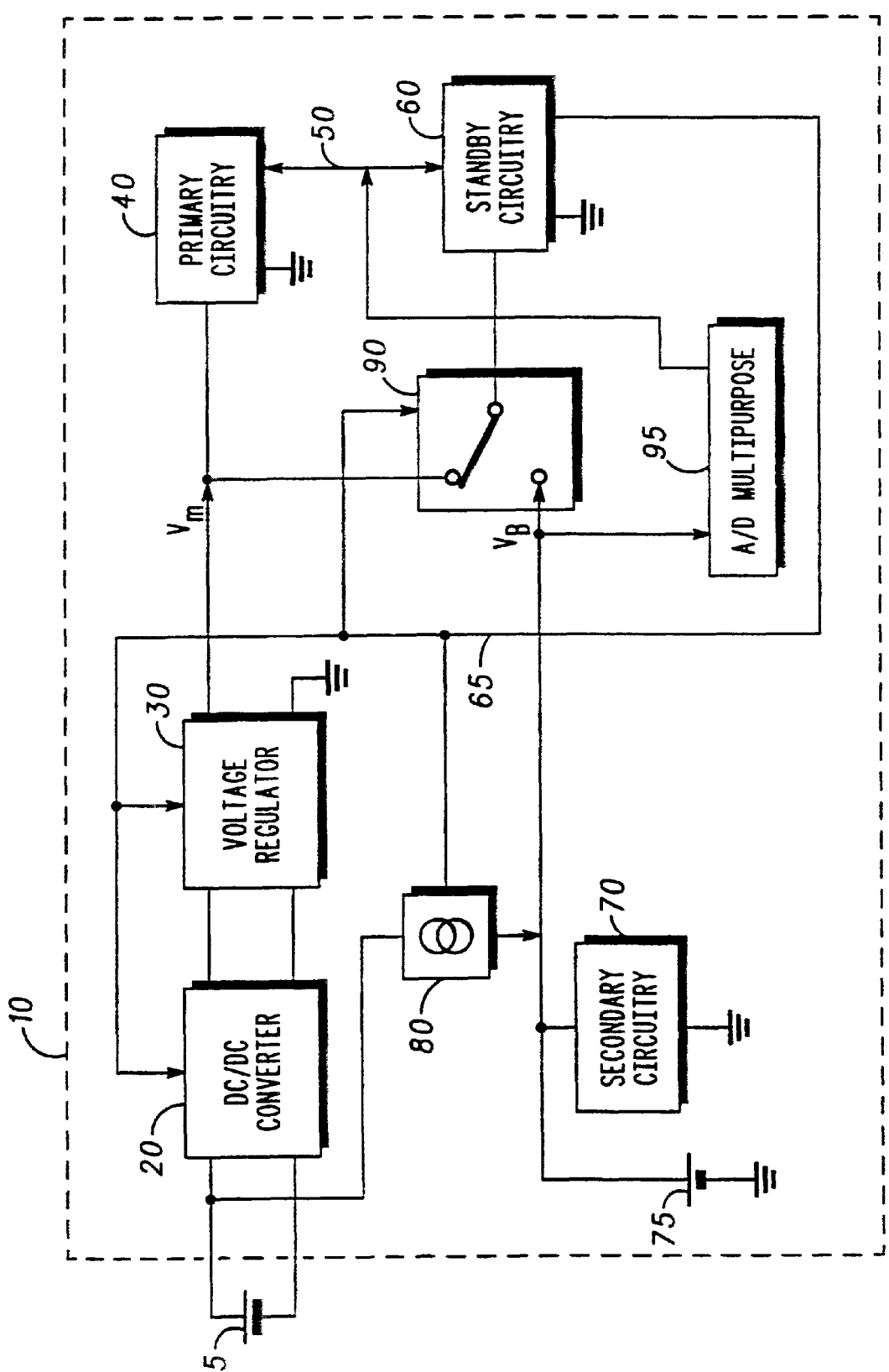

PORTABLE ELECTRONIC DEVICE AND METHOD

FIELD OF THE INVENTION

This invention relates to portable electronic devices, such as portable radio communication devices.

BACKGROUND OF THE INVENTION

When designing new portable electronic devices, a key goal is to reduce power consumption of the device. In portable radio communication devices, power is provided by a battery, via a DC/DC converter and a voltage regulator. The battery life of the device can be increased and hence talk-time or standby-time increased, by taking steps to reduce power consumption of the device. Many ideas directed to this goal have been developed.

One such idea in a cellular radio communication device is the provision of a standby (or idle) mode of operation in addition to the normal (talk-time) mode of operation. The standby mode is used when the device is turned on, but when the device is not actually transmitting or receiving any Radio Frequency (RF) signals. In this situation, the RF circuitry and data processing circuitry can remain unpowered, so that less power is consumed.

However, a problem with this arrangement is that other functions are still required during the standby mode, such as timing functions and user interface sensing functions. Power is still required by the circuits which perform these standby functions, and this is again provided by the battery, via the DC/DC converter and the voltage regulator. These last two components have a large power overhead and are a significant drain on the battery, particularly during standby mode.

There is a need to provide an improved electronic device which has reduced power consumption compared to known devices. This invention seeks to provide a portable electronic device and method which mitigates the above mentioned disadvantages.

SUMMARY OF THE INVENTION

According to a first aspect of the present invention there is provided a portable electronic device arranged to be powered by a battery and to operate in an off-mode, a standby mode and an on-mode of operation, comprising: primary electronic circuitry, operable only during the on-mode; secondary electronic circuitry operable during the off-mode; standby circuitry operable during the standby mode; a power supply circuit, arranged for coupling to the battery in order to provide power to the electronic device during the on-mode; a secondary power source, arranged to be charged by the power supply circuit during the on-mode and further arranged for providing power to the second electronic circuitry during the off-mode, wherein the secondary power source is further arranged for providing power to the standby circuitry during the standby mode, such that the power supply circuit does not operate during the standby mode.

The portable electronic device preferably further comprises a trickle-charge circuit arranged to charge the secondary power source during the on-mode. Preferably the portable electronic device further comprises a switch arranged to selectively couple one of the power supply circuit and the secondary power source in order to provide power to the standby circuitry.

According to a second aspect of the present invention there is provided a method of operating a portable electronic device arranged to be powered by a battery and having primary electronic circuitry arranged only to operate in an on-mode, standby circuitry arranged to operate in a standby mode and secondary electronic circuitry arranged to operate in an off-mode of operation, comprising the steps of: providing power to the primary electronic circuitry during the on-mode via a power supply circuit coupled to the battery; charging a secondary power source during the on-mode; providing power to secondary electronic circuitry during the off-mode via the secondary power source; providing power to the standby circuitry during the standby mode via the secondary power source, such that the power supply circuit does not operate during the standby mode.

Preferably the secondary electronic circuitry is a real-time clock circuit. The secondary power source is preferably a button cell. Preferably the primary circuitry provides main operating features of the device.

The primary circuitry preferably includes a microprocessor. Preferably the secondary power source is monitored by the standby circuitry during the standby mode, such that if the secondary power source falls below a predetermined voltage level, the power supply circuit is enabled.

The portable electronic device is preferably a mobile telephone.

In this way a protable electronic device is provided which has a reduced power consumption compared to known devices.

BRIEF DESCRIPTION OF THE DRAWING

An exemplary embodiment of the invention will now be described with reference to the single FIGURE drawing which shows a preferred embodiment of a portable electronic device circuit in accordance with the invention.

DETAILED DESCRIPTION OF A PREFERRED EMBODIMENT

Referring to FIG. 1, there is shown a battery 5 and an arrangement 10 forming part of a portable electronic device such as a mobile telephone.

A DC/DC converter 20 has a control input, and is demountably coupled to positive and negative terminals of the battery 5, for receiving a battery voltage therefrom and for providing a step-down voltage. A voltage regulator 30 has a control input, and is coupled to receive the step-down voltage from the DC/DC converter 20, for providing a regulated main voltage Vm.

Primary circuitry 40, such as a microprocessor and power amplifier of a mobile telephone, is coupled to receive the regulated main voltage Vm, and is also coupled via a bus 50 to a standby circuit 60.

Secondary circuitry 70, which may be a clock circuit, is coupled to a button cell 75, which provides a voltage Vb which is used to operate the secondary circuitry 70. A trickle-charge circuit 80 has a control input, and is coupled to receive the battery voltage from the battery 5, in order to trickle-charge the button cell 75.

The button cell voltage Vb is also fed into an Analogue to Digital (A/D) converter 95, which has a digital output coupled to the bus 50.

A switch 90 has a first switched input coupled to receive the regulated main voltage Vm from the voltage regulator 30, a second switched input coupled to receive the button cell voltage Vb, a control input and an output to be further described below.

The standby circuit 60 has a control terminal which is coupled to a control bus 65, which in turn, is coupled to the control inputs of the switch 90, trickle charge circuit 80, voltage regulator 30 and DC/DC converter 20 respectively. The standby circuitry 60 also has a power supply input coupled to receive an operating voltage from the output of the switch 90, such that either the button cell voltage Vb or the regulated main voltage Vm are used to supply operating voltage to the standby circuit 60.

In operation, the portable electronic device is arranged to have three modes of operation. In a first, off-mode, the button cell 75 provides power to the secondary circuitry 70, and all other circuits and elements of the arrangement 10 are non-functional.

In a second, on-mode, the device is fully functional and all of the circuitry and elements of the arrangement 10 are operational. The DC/DC converter 20 and voltage regulator 30 provide Vm to the primary circuitry 40, and the switch 90 is set so that the standby circuitry 60 is also supplied with operating voltage from Vm.

The trickle-charge circuit 80 charges the button cell 75. The button cell 75 has an optimum terminal voltage, which if exceeded can cause damage and lessen the charge storing capability of the button cell. The A?D converter senses the voltage Vb and sends a digital signal indicating the value of Vb to the bus 50. If Vb becomes close to or higher than the optimum voltage, the standby circuitry 60 sends a signal on the control bus to cause the trickle-charge circuit to slow down or stop the charging of the button cell 75.

During periods when the primary circuitry 40 is not required, the arrangement may enter the third, standby mode. In this mode the primary circuitry 40 shuts itself down. Typically the primary circuitry 40 will contain a microprocessor, and this will instruct the standby circuitry 60, via the bus 50, to take over operation of the arrangement 10. The primary circuitry 40 may also instruct the standby circuitry 60 when to wake it up again.

Once the primary circuitry 40 has shut down, it no longer requires the regulated main voltage Vm. In the prior art, Vm is also used to power the standby circuitry 60. This requires that the DC/DC converter 20 and the voltage regulator 30 continue to operate.

However the standby circuitry 60 requires much less power in order to function, compared with the primary circuitry 40. Therefore the standby circuitry 60 sends a control signal via the control bus 65, to set the switch 90 to connect the button cell voltage Vb with the power supply input of the standby circuitry 60. Once this is established, the standby circuitry 60 sends control signals to shut-down the DC/DC converter 20 and the voltage regulator 30.

The A/D converter 95 continues to monitor the button cell voltage Vb, and provide a digital signal indicating the voltage level to the bus 50. The standby circuitry 60 monitors this digital signal. Should the button cell voltage Vb drop such that adequate power supply to the standby circuitry 60 can no longer be assured, this will be apparent from the digital signal. The standby circuitry 60 will send control signals to start up the DC/DC converter 20 and the voltage regulator 30, before sending a further control signal to switch the switch 90 back to supplying the main regulated voltage Vm to the power supply input of the standby circuitry 60. This situation may arise with a damaged button cell, and may be used to provide an early alert to the user that the button cell needs replacing.

In this way, during the standby mode, the button cell 75 is used as a buffer energy source, and the significant amount of power required to operate the DC/DC converter 20 and the voltage regulator 30 during standby mode is conserved. The extra power required during the on-mode by the trickle-charge circuit 80 in order to charge the button cell 75 is considerably less than the amount of power conserved by not having to maintain operation of the DC/DC converter 20 and the voltage regulator 30 during standby mode.

It will be appreciated that alternative embodiments to the one described above are possible. For example, other arrangements to the control bus 65 are possible, such as dedicated control lines.

Furthermore, the A/D converter could be replaced by an equivalent circuit using voltage comparators and reference voltages.

What is claimed is:

1. A portable electronic device, arranged to be powered by a battery and to operate in an off-mode, a standby mode and an on-mode of operation, comprising:

primary electronic circuitry, operable only during the on-mode;

secondary electronic circuitry operable during the off-mode;

standby circuitry operable during the standby mode;

a power supply circuit, arranged for coupling to the battery in order to provide power to the electronic device during the on-mode;

a secondary power source, arranged to be charged by the power supply circuit during the on-mode and further arranged for providing power to the second electronic circuitry during the off-mode, wherein the secondary power source is further arranged for providing power to the standby circuitry during the standby mode, such that the power supply circuit does not operate during the standby mode.

2. The portable electronic device of claim 1, further comprising a trickle-charge circuit arranged to charge the secondary power source during the on-mode.

3. The portable electronic device of claim 1 or claim 2, further comprising a switch arranged to selectively couple one of the power supply circuit and the secondary power source in order to provide power to the standby circuitry.

4. A method of operating a portable electronic device arranged to be powered by a battery and having primary electronic circuitry arranged only to operate in an on-mode, standby circuitry arranged to operate in a standby mode and secondary electronic circuitry arranged to operate in an off-mode of operation, comprising the steps of:

providing power to the primary electronic circuitry during the on-mode via a power supply circuit coupled to the battery;

charging a secondary power source during the on-mode;

providing power to secondary electronic circuitry during the off-mode via the secondary power source;

providing power to the standby circuitry during the standby mode via the secondary power source, such that the power supply circuit does not operate during the standby mode.

5. The method of claim 4 further including the step of using a real-time clock in the secondary electronic circuitry.

6. The method of claim 4 further including the step of using a button cell for the secondary power source.

7. The method of claim 4 further including the step of using the primary electronic circuitry for providing main operating features of the device.

8. The method of claim 4 further including the step of including a microprocessor in the primary electronic circuitry.

9. The method of claim 4 further including the step of using the standby circuitry for monitoring the secondary power source during the standby mode and enabling the power supply circuit when the secondary power source falls below a predetermined voltage level.

10. The method of claim 4 further including the step of using the portable electronic device in a mobile telephone.

* * * * *